UNITED STATES PATENT OFFICE.

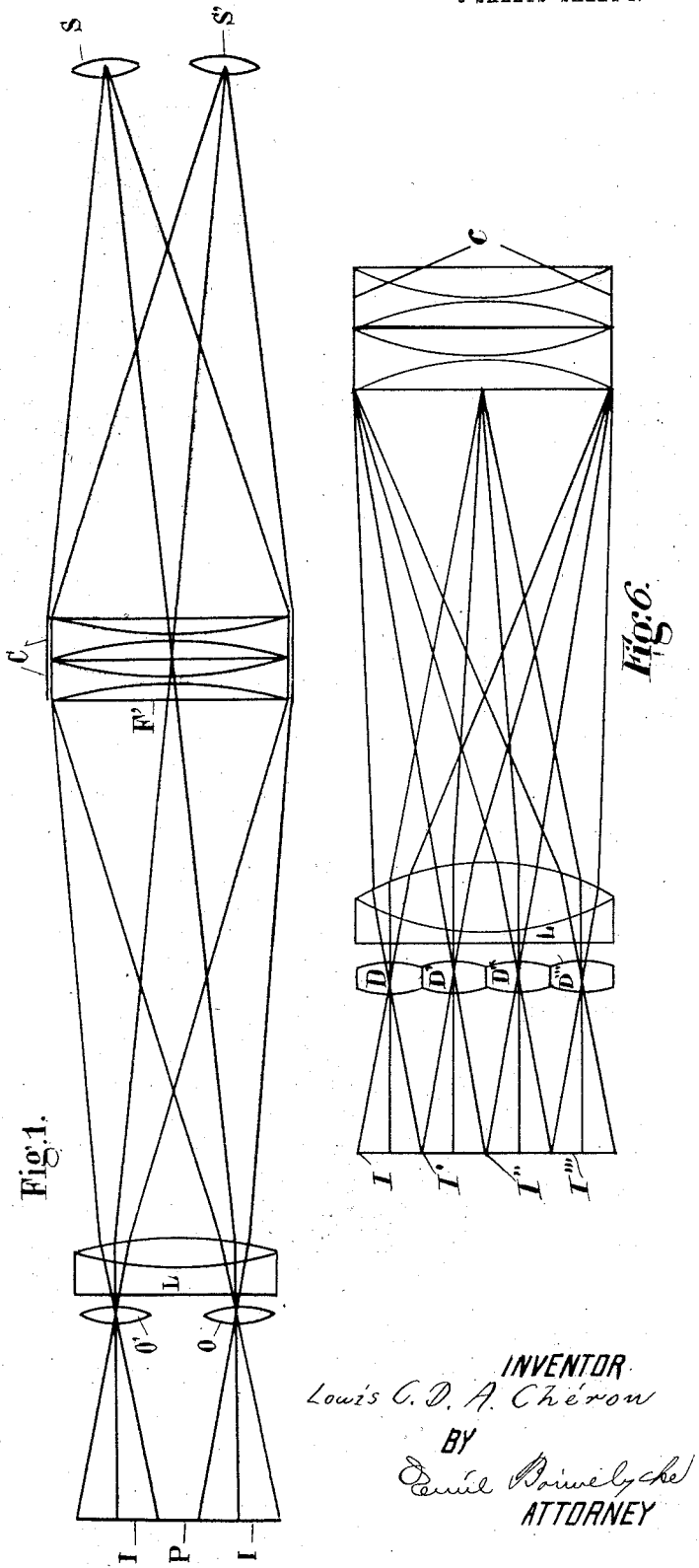

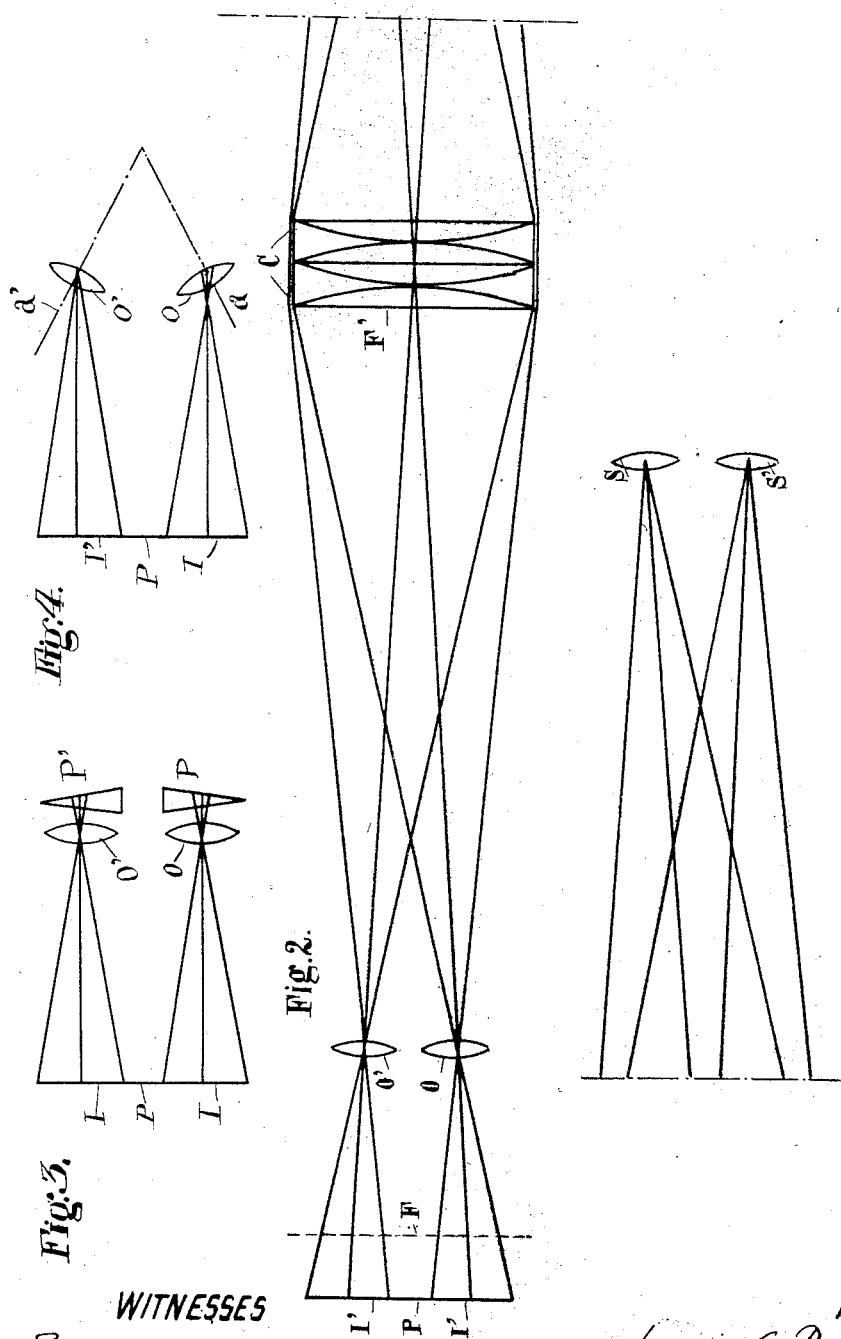

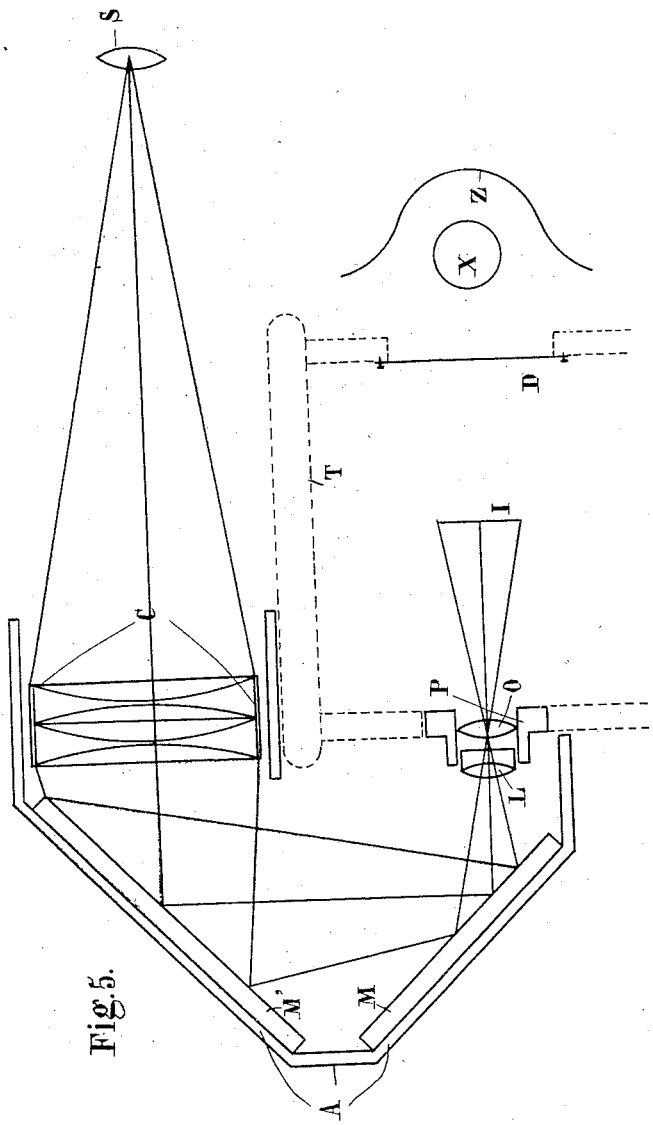

LOUIS CAMILLE DANIEL ANDRÉ CHÉRON, OF PARIS, FRANCE.

STEREOSCOPE.

1,114,232.  Specification of Letters Patent.  Patented Oct. 20, 1914.

Application filed October 13, 1913. Serial No. 794,934.

*To all whom it may concern:*

Be it known that I, LOUIS CAMILLE DANIEL ANDRÉ CHÉRON, a citizen of the Republic of France, and resident of Paris, France, have invented a certain new and useful Stereoscope, which is fully set forth in the following specification.

This invention relates to apparatus by means of which it is possible to magnify ordinary stereoscopic photographs, without the illusion of relief being in the least affected. It is known that for producing this relief impression, one condition is necessary which is that the right eye shall perceive the image formed by the right hand object glass, and only that image, and, conversely, that the left eye shall see only the image formed by the left-hand object glass, which condition is easily fulfilled in ordinary stereoscopes, owing to the presence of two eye-pieces which enable each eye to look only at the corresponding image situated in the focal plane of the eye-pieces.

This invention chiefly consists in enlarging the two pictures of a stereoscopic photograph or other object by projecting and, moreover, superposing them on a single condenser, in such a manner that the rays coming from the right-hand picture, and the rays coming from the left-hand picture, after having intersected each other and continued their paths in accordance with their respective axes of projection, shall converge, the former only toward the right eye, and the latter only toward the left eye of the observer. Each eye thus sees only the real enlarged image of the corresponding picture, which is an essential condition for producing the illusion of relief.

The apparatus comprises two main optical devices: the first one enables the images of the two pictures to be projected and at the same time enlarged and superposed (which result can be obtained in several ways, the chief among which are hereinafter described by way of example), and the second is designed to make some of the rays forming the two superposed images, converge toward the right eye, and the others toward the left eye of the observer.

In the accompanying drawing:—Figures 1 to 4 are diagrammatic plan views showing various arrangements of the said devices. Fig. 5 is a vertical section of an apparatus wherein such arrangements may be carried out. Fig. 6 is a diagrammatic plan view of a still further arrangement.

In order to project and enlarge the two images by superposing them, as already stated, several arrangements may be followed, all of which employ two object glasses, (which can be ordinary achromatic lenses), corresponding each to one of the component pictures I, I' of a stereoscopic photograph or other object. In the first arrangement, (Fig. 1), the object P is located in the focal plane of the object glasses O and O', the axis of each of which glasses passes through the center of the corresponding picture. An achromatic lens L, of sufficient diameter to cover both glasses, is inserted in front of them, and the two images projected are then formed and superposed in the focal plane F' of that lens. In fact the rays emitted by any two symmetrical points on the two pictures, are naturally caused by the object glasses to parallel each other, and these two parallel rays, after having passed through the lens L, will naturally converge at one and the same point in the focal plane of the said lens. If the focal length of the single lens is twice or three times greater than that of the object glasses, the images projected will be formed at a distance from the lens which is twice or three times greater than that separating the object glasses from the object, and the enlargement will, therefore, be two or three diameters, that is to say, four or nine areas. Naturally, in order to avoid useless bulk and weight, the large achromatic lens producing the superposition of the images can be cut in the shape of a rectangular band of dimensions sufficient simply to cover the two object glasses.

In the second arrangement, (Fig. 2), the object P is arranged beyond the joint focal plane F of the two object glasses O, O', at the desired distance in order that, without interposition of any other lens, the projected images of the pictures I, I' may be formed in the plane F' at the other side of the two object glasses, which images will be two or three times larger, for instance, if it is desired to obtain enlargement of two or three diameters. But as it is necessary not only to project and magnify the images, but also to superpose them, as stated before, the object glasses are moved toward each other, so that the principal axis, instead of passing through the center of the corresponding picture, is shifted toward the other picture, to a sufficient extent in order that the superposition of the images projected shall take place in the said plane F'. For instance, if the magnifying obtained is of three diameters, the distance separating the object from the object glasses represents a quarter of the total distance separating the said object from the plane of projection, and the shifting of centers of the object glasses relatively to each other will be a quarter of the distance separating the centers of the images.

In the third arrangement (Fig. 3), while the projecting and the magnifying are still carried out as in the second arrangement, the superposition of the images in the projection plane can be obtained by the simple interposition in front of each object glass of a prism p p' of a suitable angle, the side faces of the prisms being arranged vertically and their bases turned toward each other. But owing to dispersion, irisations on the outlines of the images will take place, unless specially-constructed prisms are used.

When carrying out the projecting and the magnifying as in the second arrangement, the superposition of the images could be obtained by inclining the two object glasses toward each other, so that their axes a a' instead of being parallel, form an acute angle, as shown in Fig. 4. This arrangement is, moreover, equivalent to a shifting of the centers of the object glasses relatively to each other, but it results, on the other hand, in a fairly perceptible deformation of the images. The paths of the rays, Figs. 3 and 4, if extended, would be identically the same as in Figs. 1 and 2.

Obviously, the shifting of centers, interposition of a prism, or the inclination of the axis could be applied only to a single object glass, instead of to both, but the extent of shifting the center or of the inclination of the axis, or of the angle of the prism, must in such case be double that what it would be when both object glasses have their centers shifted or are inclined or covered by a prism. Also the achromatic lens (in the first arrangement), and the prisms, (in the third arrangement), may be situated behind, instead of in front of the object glasses.

Whatever be the arrangement employed, it will be seen that the first condition to be fulfilled, is to project the images, at the same time magnifying and superposing them in their plane of projection.

The second device is designed to fulfil the second condition, which is to make the rays coming from the right-hand image converge toward the right eye of the observer, and those from the left-hand image, toward his left eye. This device consists simply of a single condenser C, (Figs. 1 and 2), preferably constituted by four or five plano-convex lenses secured in a single mount, the shape and dimensions of which must correspond to the shape and dimensions of the two images superposed on the said condenser arranged exactly in the projection plane F' of the said images.

The whole of the four or five lenses of the condenser must have such a focus that the object glasses should be at one side at about double the said focal distance. Under these conditions, the condenser will produce at the other side, also at a distance double that of its focal length, the images, of the same size of the two object glasses, and the said images will represent the fields in which the eyes of the observer must be situated in order to see with their full relief the two real images, i. e., the pictures of the stereoscopic photograph, magnified and superposed in the plane of the condenser. In fact, the rays projected by the right-hand object glass O, after having formed the right-hand image and intersected the rays forming the left-hand image at the plane of the condenser, are not deflected by the latter from their axis of projection, but the condenser makes them all converge to a point S on the said axis situated, (under the conditions hereinbefore assumed), at double its focus, and the said point represents exactly the image of the right-hand object glass.

The same is exactly true for the rays projected by the left-hand object glass O', which, at the point S', which point represents the image of the left-hand object glass. It is sufficient that the right eye of the observer should be in the field represented by the image of the right-hand object glass, and his left eye in the field represented by the image of the left-hand object glass, in order that the two images of the photograph superposed in their plane of projection at the plane of the condenser, but seen each separately by the corresponding eye of the observer, should produce the impression of stereoscopic relief. In order to determine the position for the eyes in an exact manner, an eye-piece can be fixed at the point where the image of each object glass S, S' is formed and, like in an ordinary stereoscope, the lens of each eye-piece must have a focus approximately equal to the distance separating the eye-piece from the image, that is to say, in the present case from the condenser on which the two images are projected and superposed. But as the said distance is generally greater than 25 cm., the lenses may be dispensed with, and merely the cylindrical mounts of the eye-pieces retained, intended simply to determine the position of the eyes. Nevertheless, this entire arrangement would be practically useless in the form described, (that is to say if the stereoscopic photograph, the object glasses and the condenser were in the same horizontal plane), as the length of the apparatus would render it too cumbersome. In fact, even supposing that it is a question of photographs 45x107 mm., which are the most usual ones and have the great advantage of requiring a photographic apparatus of very small dimensions, the apparatus employed to magnify the photographs 2½—3 diameters would require a length of at least 60-70 cm. It is, therefore, advisable to interpose in the path of the rays one or more mirrors M M', (Fig. 5), so as to break up the said path, and to reduce to the same extent the dimensions of the apparatus A. In order to avoid the double reflection and the formation of secondary images, it is preferable to use mirrors silver-plated on their outer surface. Moreover, it is possible to build an apparatus which could be adapted to different types of stereoscopes, the mechanical part thereof which is tended for the successive passage of the photographs in front of the eye-pieces can be retained, and the few parts which have to be replaced can be easily removed or put on at will.

Fig. 5 is a diagrammatic view of the apparatus which appears to be the most practical and which can be easily adapted to any classifying stereoscope of the usual type. The dotted lines show the upper portion of such a stereoscope T. A plate P carrying the object glasses fits into a ground glass frame of the stereoscope. O is one of the object glasses utilized to project the image of one of the pictures I of the ordinary stereoscopic photograph, which is seen at the place which it normally occupies in the stereoscope. The two images are superposed at the plane of the said condenser owing to the achromatic lens L covering the two object glasses, (as in Fig. 1). Of course, any of the other superposition arrangements hereinbefore referred to, might be used. In the path of the rays, at M and M', are inserted two mirrors inclined at an angle of 90° relatively to each other, and both inclined at an angle of 45° to the horizontal.

The rays, after having been reflected twice and formed the image at the plane of the condenser C, are concentrated by the latter at S where is situated one of the eye-pieces, (or one of the eye-piece mounts), secured by a rod to the cover of the stereoscope, or secured to the lighting apparatus which will be hereinafter described. The apparatus being represented in side elevation, it is impossible to show, as in the other figures, the second picture I' the second object glass O' and the second eye-piece S' situated, respectively, in the same horizontal plane as the picture I, object glass O and the eye-piece S.

Of course, this device makes it necessary to light the object from the front, instead of from the back of the stereoscope, where the magnifying apparatus is situated. The eye-pieces may be retained, and in front of each of them, in a single casing, can be arranged a small electric lamp, the rays of which are diffused by a ground glass inserted between the eye-pieces and the photograph. It is, however, preferable to cut a large shutter in the upper portion of the stereoscope door carrying the eye-pieces, and to replace it by a ground glass D, in front of which will be arranged one or two electric bulbs X provided with a reflector Z; the said ground glass might, however, be arranged in any other suitable position, namely close to the photograph.

As already stated, the right eye must see only the right-hand image, and the left eye only the left-hand image. As the images are superposed, and as the rays intersect at the plane of the condenser, each eye would see the opposite image, if the photographic pictures constituting the object were left, gelatin slide in front, in their grooved frames, as in an ordinary stereoscope. It is, therefore, necessary to place the photograph with the gelatin side backward, (that is to say, the gelatin facing the magnifying apparatus), in order that each eye shall see the image intended for it. But in any case it is not necessary to turn the photograph upside down, for if each image is turned over in the horizontal direction, owing to its projection through an object glass, it is straightened in the vertical direction owing to its double reflection on the mirrors arranged at an angle of 90°. Finally, if it is desired to take advantage of the device which, in certain classifying stereoscopes, makes it possible to read an inscription on the gelatin side between the two pictures of the photograph, it is necessary to turn such device over and to place it behind the photograph projected, that is to say, between the latter and the object glasses of the magnifying apparatus.

In the preceding description, there has been mention only of magnifying photographs of a size 45 x 107 mm., because it is the most usual stereoscopic size and, (being also the smallest), benefits to the greatest extent by the magnifying of the images, but it is needless to add that everything that has been said with reference to that size, is equally well applicable to any other stereoscopic size. Moreover, instead of being fitted to a "classifying" stereoscope, the price of which is always high, the apparatus described might also be fitted to an ordinary stereoscope in which the objects are introduced by hand into a groove provided for the purpose. A system of lighting will, however, always be indispensable and, moreover, the weight and the dimensions of the magnifying apparatus combined with a stereoscope, no matter how small, will always necessitate the use of a leg or some support. Moreover, the mirrors, instead of being arranged as described, might be combined in some other way, for instance so as to break the rays, in passing, into the shape of a Z, or in any other manner intended to reduce the bulk and the length of the apparatus.

By using ordinary stereoscopic photographs or the like, it is possible to view them as enlarged two or three diameters, and, consequently, four to nine times larger in area, and the stereoscopic relief is, for reasons hereinbefore indicated, entirely maintained, but, except that the things are seen larger, nothing more is seen than in an ordinary stereoscope. The objects remain fixed in their respective positions, and the eyes cease to see the image as soon as they leave the field of the eye-pieces. Nevertheless, the apparatus described is also suitable for examining photographs made with a special apparatus taking more than two pictures of the same object in a single exposure and on one plate. These photographs, examined with the above mentioned apparatus, not only show the stereoscopic relief, but also the shifting of the objects relatively to each other, as the eyes are being moved in a horizontal line, at least within certain limits.

Let it be assumed that the stereoscopic photograph or object comprises four pictures I, I′, I″, I‴ arranged side by side, (Fig. 6), these four pictures representing the four different aspects of the object S seen from four different points. This photograph or object is placed into a magnifying stereoscope similar to that hereinbefore described, in which the two object glasses are replaced by four object glasses D, D′, D″, D‴ (Fig. 6), the axes of which must correspond to the centers of the pictures and which can be simple achromatic lenses. These object glasses must be cut as shown in Fig. 6 so as to be tangent along lines, and not along simple points. A single achromatic lens L covering the four object glasses, projects and superposes the images of the four pictures into its focal plane in which is arranged the condenser C. The latter causes the rays to converge to a plane where are formed the images arranged side by side of the four object glasses representing four zones in which the eyes, in moving horizontally, will see the object S in four different aspects that it would have if viewed successively from the four points. (In order not to complicate the figure, the path of the rays have not been shown beyond the condenser C, and no account has been taken of the reflection due to mirrors).

Assuming that the size of 45x107 mm. is retained, the apparatus will comprise, for instance, four small rectangular cells each 25 mm. wide by about 35 mm. high, to which will correspond four object glasses of identical focus, provided with a joint shutter. The photographic plate, in a frame, will be arranged in the focal plane, and it will present, after development, four images arranged side by side in the direction of length, each 25x35 mm.

In the magnifying stereoscope, the lenses forming the object glass must be cut to 25 mm., so as to be tangent by lines, and so as to correspond exactly to the four images which they will project on the condenser. The large achromatic lens covering the four object glasses must, therefore, be at least 10 cm. in diameter, and it could, of course, be cut in the shape of a rectangular band covering the object glasses, although other sizes and other dimensions could be adopted, as, for instance, those adopted for ordinary stereoscopic photographs. Moreover, the number of images of each photograph and, consequently, the number of cells of the apparatus and the number of corresponding object glasses, could be reduced to three or increased to a larger number.

I claim :—

1. In a magnifying stereoscope, the combination of an optical device for projecting, magnifying and superposing the images of the two component pictures of a stereoscopic photograph; and an optical device for causing the rays coming from the right-hand image to converge toward the right eye, and those coming from the left-hand image toward the left eye of the observer.

2. In a magnifying stereoscope, the combination of two object glasses for projecting and superposing the images of the two component pictures of a stereoscopic photograph placed in the joint focal plane of said glasses, the axis of each glass passing through the center of the corresponding picture; an achromatic lens of sufficient diameter to cover the two object glasses inserted adjacent the same; and an optical device for causing the rays coming from the right-hand image, to converge toward the right eye, and those coming from the left-hand image toward the left eye of the observer.

3. In a magnifying stereoscope, the combination of two object glasses for projecting and superposing the images of the two component pictures of a stereoscopic photograph arranged in the joint focal plane of said glasses, the axis of each glass passing through the center of the corresponding image, an achromatic lens of sufficient diameter to cover the two object glasses inserted in front thereof; and a single condenser arranged in the plane of projection of the images and constituted by plano-convex lenses arranged back to back and secured in a single mount.

4. In a magnifying stereoscope, the combination of an optical device for projecting, magnifying and superposing the images of the two component pictures of a stereoscopic photograph; an optical device for causing the rays coming from the right-hand image to converge toward the right eye, and those coming from the left-hand image toward the left eye of the observer; and a system of mirrors inserted between said optical devices to break up the path of the rays and reduce the length and the bulk of the apparatus.

5. In a magnifying stereoscope, the combination of an optical device for projecting, magnifying and superposing the images of the two component pictures of a stereoscopic photograph; an optical device for causing the rays coming from the right-hand image to converge toward the right eye, and those coming from the left-hand image toward the left eye of the observer; a system of mirrors inserted between the said optical devices to break up the path of the rays and reduce the length and bulk of the apparatus; and a system of lighting for the stereoscopic photographs.

6. In a magnifying stereoscope, the combination of an optical device for projecting, magnifying and superposing the images of the two component pictures of a stereoscopic photograph; an optical device for causing the rays coming from the right-hand image to converge toward the right eye, and those coming from the left-hand image toward the left eye of the observer; a system of mirrors inserted between the said optical devices to break up the path of the rays and reduce the length and bulk of the apparatus; a system of lighting for the stereoscopic photographs; and a system of eye-pieces for viewing the final magnified and superposed images.

7. In a magnifying stereoscope, the combination of an optical device for projecting, magnifying and superposing the images of the plurality of component pictures of a stereoscopic photograph; and an optical device for causing some of the rays forming the superposed images toward a plurality of points of observation.

In testimony whereof I have signed this specification in the presence of two subscribing witnesses.

LOUIS CAMILLE DANIEL ANDRÉ CHÉRON.

Witnesses:
EMILY LEDRET,
HANSON C. COXE.